US012377730B2

(12) United States Patent
Straßer

(10) Patent No.: US 12,377,730 B2
(45) Date of Patent: Aug. 5, 2025

(54) MOTOR VEHICLE WITH DC VOLTAGE CONVERTERS AND METHOD FOR OPERATING A MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 149 days.

(21) Appl. No.: 18/322,447

(22) Filed: May 23, 2023

(65) Prior Publication Data

US 2023/0382229 A1  Nov. 30, 2023

(30) Foreign Application Priority Data

May 25, 2022  (DE) .......................... 102022113199.8

(51) Int. Cl.
*B60L 3/00* (2019.01)
*B60L 53/22* (2019.01)

(52) U.S. Cl.
CPC ............... *B60L 3/003* (2013.01); *B60L 53/22* (2019.02); *B60L 2210/10* (2013.01)

(58) Field of Classification Search
None
See application file for complete search history.

(56) References Cited

U.S. PATENT DOCUMENTS

2012/0176817 A1   7/2012  Lu
2014/0103710 A1   4/2014  Daqqa et al.
2022/0247319 A1*  8/2022  Baumann ............ H02M 1/0003
2022/0371462 A1* 11/2022  Isaksson ................. B60L 53/57
2024/0375545 A1* 11/2024  Sorani ..................... B60L 58/20

FOREIGN PATENT DOCUMENTS

| CN | 105059129 A | 11/2015 |
| DE | 102011011800 A1 | 8/2012 |
| DE | 102013001564 A1 | 8/2013 |
| DE | 102012109725 A1 | 4/2014 |
| DE | 102018210943 A1 | 1/2020 |
| EP | 3751715 A1 | 12/2020 |
| JP | H10191624 A | 7/1998 |
| JP | 2013090519 A | 5/2013 |

* cited by examiner

*Primary Examiner* — Jared Fureman
*Assistant Examiner* — Aqeel H Bukhari
(74) *Attorney, Agent, or Firm* — Seed IP Law Group LLP

(57) ABSTRACT

A motor vehicle includes a first voltage network and a second voltage network, an operating voltage of the second voltage network being lower than an operating voltage of the voltage network, and two DC voltage converters connecting the second voltage network to the first voltage network, each of the DC voltage converters including a hardware regulator that regulates the operating voltage of the second voltage network, the DC voltage converters being physically separated in the motor vehicle, the hardware regulators of the DC voltage converters being connected via a communication connection having at least one communication line, a first one of the hardware regulators, in operation, sends regulating information via the communication connection to a second one of the hardware regulators, and the second one of the hardware regulators, in operation, performs a regulating operation based on the regulating information sent by the first one of the hardware regulators.

15 Claims, 1 Drawing Sheet

MOTOR VEHICLE WITH DC VOLTAGE CONVERTERS AND METHOD FOR OPERATING A MOTOR VEHICLE

BACKGROUND

Technical Field

The disclosure relates to a motor vehicle, comprising a high-voltage network and a low-voltage network, wherein the operating voltage of the low-voltage network is lower than the operating voltage of the high-voltage network, and two DC voltage converters connecting the low-voltage network to the high-voltage network, wherein each of the DC voltage converters comprises a regulator unit for regulating to the operating voltage of the low-voltage network and the DC voltage converters are arranged physically separated in the motor vehicle. In addition, the disclosure relates to a method for operating such a motor vehicle.

Description of the Related Art

Many modern motor vehicles, particularly electric vehicles and hybrid vehicles, utilize at least two onboard networks, especially a high-voltage network and a low-voltage network. The voltage of the low-voltage network is usually at a lower voltage traditionally known for onboard networks, such as 12 V or even 48 V. High-voltage networks, to which a corresponding electric machine is usually connected in the case of electrically powered motor vehicles, utilize distinctly higher values for the operating voltages, such as more than 200 V, in particular in the range of 350 to 860 V. A high-voltage battery, from which the high-voltage network can be powered, is usually connected to high-voltage networks.

In order to make available the energy from the high-voltage network for the low-voltage network as well, it has been proposed to provide a DC voltage converter (DC-DC converter) between the high-voltage network and the low-voltage network. In this way, it is conceivable for example to do away even with the battery in the low-voltage network itself. The DC voltage regulator preferably ensures that the operating voltage of the low-voltage network, such as 12 V, remains intact. This means that more energy can be supplied from the high-voltage network during large load demand, while during low load demand the consumer of the low-voltage network is provided with less electric power from the high-voltage network or there might not even be any power transfer at all. It is also basically conceivable to equalize a power deficit in the high-voltage network from the low-voltage network, at least for a short time.

Especially in regard to vehicle functions designed for fully automatic driving that can be provided by corresponding vehicle systems, i.e., so-called "autonomous driving," the safety and redundancy requirements in motor vehicles are distinctly greater. For example, with ASIL (Automotive Safety Integrity Level) there exists a standard which safety requirements for components in motor vehicles can take into account. For example, the ASIL standard defines various safety classes, and in order to fall into these safety classes the components must fulfill certain safety requirements. As regards a DC voltage converter, especially in the context of autonomous driving, it is usually required that it fulfill heightened safety requirements in terms of availability (fault safety). Nevertheless, for further heightening of the safety, a redundant design has also been proposed in the meantime, in which two DC voltage converters are present, connecting the high-voltage network and the low-voltage network. In this case, one of the DC voltage converters can fulfill higher safety requirements than the other one, so that an ASIL converter and a QM converter can be provided as the DC voltage converters, for example.

It is also favorable to the safety in terms of this redundancy to locate the two DC voltage converters at different places within the motor vehicle, so that for example in event of accident-related damaging of one DC voltage converter the other DC voltage converter is not also necessarily damaged. In other words, it can be said that the two DC voltage converters contribute to the same low-voltage network, but generally at different geometrical points.

Furthermore, the most diverse consumers are connected to the low-voltage network, being switched on or off at different time points. When two DC voltage converters are used, this can result in oscillations in the regulating of these DC voltage converters, since both will try to regulate the onboard network from different positions within the motor vehicle, especially from different node points. If the regulating attempts occur too quickly, the two DC voltage converters may build up in oscillation, but if the regulating is too slow there is a danger of the voltage falling too much in the low-voltage network and primary safety-relevant components, such as the steering and/or the brakes, might no longer be supplied with sufficient electric power. This is especially relevant when a critical driving condition occurs, usually resulting in a sudden high load demand in the low-voltage network.

EP 3 751 715 A1 relates to a control system for a battery system. Here, an N-phase DC voltage converter has N single-phase DC voltage converters. Different microcontrollers control different portions of the N single-phase DC voltage converters. The microcontrollers are connected by a data link. The microcontrollers can be synchronized by way of the data link for the combined control of the N sing-phase DC voltage converters, while in another operating mode an autonomous control of the two portions independently of each other can also occur.

JP 2013/090519 A discloses a system of power sources, comprising a plurality of parallel DC voltage converters, where differences in the activating of the corresponding switch elements of the DC voltage converters due to transmission delays of a synchronization pulse in the digital control process are to be avoided. A master controller here sends the synchronization pulse to a first and a second slave controller, and the master controller can speed up the sending based on a delay time.

CN 105059129 A relates to a hybrid power source in an electric vehicle. The corresponding vehicle power supply system comprises a plurality of DC voltage converters. An energy management module communicates with the DC voltage converters and monitoring devices. The DC voltage converters are synchronized such that when triggered they are switched at the same time by way of the energy management module.

BRIEF SUMMARY

Embodiments of the disclosure provide a way of achieving greater stability in a low-voltage network, especially during highly dynamic loading events.

According to the disclosure, in a motor vehicle of the kind mentioned above, the hardware regulators of the DC voltage converters are connected via a communication connection having at least one communication line, wherein at least one of the hardware regulators is configured to send regulating information describing its regulating operation via the communication connection to the other hardware regulator and the hardware regulator receiving the regulating information is configured to take this into account during its regulating operation.

The present disclosure focuses on the highly dynamically responding hardware regulators provided in the DC voltage converters, which can be configured for example as microcontrollers, FPGA and/or ASIC and which can respond with the least possible latency to highly dynamic changes in the load demands. In this regard, it can be provided specifically that the hardware regulator is designed to carry out a feedforward in the framework of a control hierarchy, the DC voltage converters being connected by a bus system to an energy management controller, which is designed to dictate a control strategy on an overarching time scale in dependence on data received via the bus system from the DC voltage converters. Thus, one idea of the present disclosure is to provide a hard-wired (in particular) communication connection between the corresponding hardware regulators already at the highly dynamic feedforward level, in order to achieve in this way a mutual attuning of the regulating strategy of the hardware regulators in the fastest possible time in event of suddenly occurring load demands or load fluctuations, for example, so that oscillation/build-up events are avoided as much as possible. In other words, the goal of the regulating process is to accomplish a mutually attuned regulating operation especially in the case of highly dynamic events, for example those on a time scale of around 1 µs to 10 ms, and/or the fastest possible uniform attainment of the operating voltage in the low-voltage network, especially without any oscillation/build-up events.

For in the context of the present disclosure it has been discovered that, even if the regulating strategies of the two DC voltage converters are already attuned to each other, for example by way of an energy management controller, unwanted effects or error conditions can also already occur on account of the high dynamics with which load demands can arise especially in critical driving situations, because of the initially independent (feedforward) operation by way of the hardware regulators. For example, it is known in the prior art how to connect the DC voltage converters via a bus system or the like to each other and/or to the energy management controller, but then latency times of up to 20 ms, in many cases even more, can occur on account of the communication. These cannot always assure an adequate response.

Therefore, the present disclosure proposes an additional, extremely fast, discrete and highly available communication connection between the two hardware regulators themselves, especially those provided for the feedforward, so that these do not regulate the low-voltage network separately on this time scale, but instead can communicate with each other. In this way, an enhanced network stability is provided for the low-voltage network and thus an enhanced availability, especially in autonomous motor vehicles.

With special advantage, the hardware regulators and the communication connection can be configured such that the time until the regulating information of the one hardware regulator is present at the other hardware regulator is less than 100 µs, especially less than 50 µs. This is a distinctly faster communication than could be achieved through a bus system, for example.

Advisedly, the communication connection can be bidirectional, especially by using at least two communication lines. Each of the at least two communication lines can be assigned to one transmission direction, in order to achieve the least disturbed transmission possible. In this way, it is possible with special advantage for the hardware regulators to mutually send regulating information and take this into account respectively during the regulating operation.

The at least one sending hardware regulator can be designed for analog or pulse-width modulated transmission of the regulating information. In particular, a proprietary communication protocol can be used. A pulse-width modulated transmission is especially advisable when the hardware regulators have a digital working, since then it is possible to omit a digital-analog conversion, which would require additional latency time. However, if the hardware regulators work at least partly in analog manner, an analog transmission of the regulating information can also be advisable.

With special advantage, however, it can be provided that the at least one sending hardware regulator is designed to transmit a regulating signal used to activate components of the respective DC voltage converter, especially to activate semiconductor switches, as the regulating information also to the other hardware regulator. In this way, the regulating output of the other hardware regulator is provided as regulating information directly describing the regulating process and input immediately understandable by the other receiving hardware regulator without any time loss due to additionally required signal processing. In other words, it is not only possible to communicate the regulating information extremely fast across the communication connection, but also in addition a processing ability in few processing steps is possible on the part of the receiving hardware regulator, since the regulating information is already present in the correct "language" so to speak. The at least one receiving hardware regulator is therefore configured appropriately to utilize the additional control input and take it appropriately into account, for example when its own control response is weaker or when the other control response is at least partly compensated. A corresponding adaptation of the architectures of the hardware regulators, for example the configuration of a microchip, can be easily implemented according to the specific control process desired.

In particular, it should further be pointed out in this place that such an extremely fast transmission of the regulating information also makes possible a kind of "advance warning" of the other DC voltage converter when a steep pulse edge is noticed in the load demand at first in one of the DC voltage converters, inasmuch as the DC voltage converters are preferably connected to the low-voltage network at different positions or locations. Hence, in such situations it is conceivable that an anticipatory control in regard to a highly dynamic process will be done by the hardware regulator of the other DC voltage converter.

A proprietary transmission protocol can also be used advisedly for the transmission of (possibly other) regulating information if regulating signals are not sent (exclusively) as the regulating information.

It is also conceivable, but less preferable, in the context of the present disclosure for the hardware regulators to form a master-slave architecture, where in particular the hardware regulator of a DC voltage converter of the DC voltage converters fulfilling a higher safety requirement is configured as the master. Basically, an external master is even conceivable, but this is less preferable on account of the further latency introduced. In a master-slave architecture, the fast, highly available communication via a discrete communication connection provided in addition to a bus will thus be utilized to implement accordingly a common feedforward control strategy on the faster time scale, especially for the feedforward, so that it is especially conceivable to relay instructions to the slave hardware regulator as the regulating information.

In one expedient modification, the discrete, fast and highly available communication connection can also be utilized further. Thus, it can be provided that, upon recognizing a malfunction of one of the DC voltage converters by way of the hardware regulator of the other DC voltage converter and/or a safety device connected in addition to the communication connection, the recognizing hardware regulator and/or the safety device is configured to send a deactivation signal to the DC voltage converter having the malfunction via the communication connection. Thus, if implausible regulating information and/or regulating information otherwise indicating a fault or additional fault signals are found from one of the hardware regulators of one of the DC voltage converters, it is possible to deactivate it. In addition, it is possible to switch for example to an emergency operation of the low-voltage network, especially if the remaining DC voltage converter is not designed to provide the maximum possible power in the low-voltage network from the high-voltage network. In other words, the communication connection can be utilized in the fault situation to switch off one of the DC voltage converters if this has a defect and/or is regulating in an invalid range.

It can also be advisedly provided in the context of the present disclosure that one of the DC voltage converters fulfills higher safety requirements than the other DC voltage converter. For example, one of the DC voltage converters can fulfill safety requirements per an ASIL class, while the other one only fulfills ordinary quality management safety requirements. In addition or alternatively, one of the DC voltage converters, especially the DC voltage converter fulfilling the higher safety requirements, can be connected to or close to battery contactors of a high-voltage battery powering the high-voltage network. In particular, it is conceivable here that the DC voltage converter fulfilling the higher safety requirements is connected behind the battery contactors of a high-voltage battery, so that even when the high-voltage battery is disconnected from the high-voltage network the high-voltage battery is still capable of powering the low-voltage network by way of the DC voltage converter and maintaining at least some of the functions of the motor vehicle, even if the high-voltage network needs to be deactivated, if only temporarily.

As already mentioned, the DC voltage converters can advisedly be installed at different locations within the motor vehicle. This physical separation of the DC voltage converters can provide a further improvement in the functional safety, since for example if only one region of the one DC voltage converter is damaged on the motor vehicle, for example by a collision, the other DC voltage converter can continue to be available. In particular, one of the DC voltage converters can be situated in the rear area of the motor vehicle and one of the DC voltage converters in a front area of the motor vehicle, for example in the engine compartment.

Both DC voltage converters need not be designed to provide the maximum required power in the low-voltage network. Preferably, each of the DC voltage converters is designed to provide by itself a sufficient power for the operation of safety-critical consumers in the low-voltage network and/or half of a maximum peak power required in the low-voltage network. It has been shown in practice that half of the maximum conceivable load demand is at least substantially adequate in the low-voltage network to continue operating all safety-critical consumers, for example in event of a failure of one of the DC voltage converters. Comfort functions can then be deactivated, for example, such as a multimedia system, the seat cushion heating, or the like. The providing of half of the peak power by both DC voltage converters is preferable, since then both DC voltage converters are designed in any case to provide together the maximum peak power.

The communication connection as the at least one communication line can comprise a typical metallic conductor, such as a copper line. However, it is also conceivable to use a fiber optic line, which may be faster in this regard, as the at least one communication line. This is especially feasible if the latency due to the use of optical transducers proves to be less than the time loss when using a conventional metallic communication line. Multiple lines can be provided in the form of a cable.

Besides the motor vehicle, the present disclosure also relates to a method for operating a motor vehicle according to the disclosure, wherein at least one of the hardware regulators sends regulating information describing its regulating operation via the communication connection to the other hardware regulator and the hardware regulator receiving the regulating information takes this into account during its regulating operation. All the remarks made about the motor vehicle according to the disclosure hold accordingly for the method according to the disclosure, so that the benefits already mentioned can also be achieved with it.

BRIEF DESCRIPTION OF THE SEVERAL VIEWS OF THE DRAWINGS

Further benefits and details of the present disclosure will emerge from the exemplary embodiments described below, as well as with the aid of the drawing.

DETAILED DESCRIPTION

Figure 1:
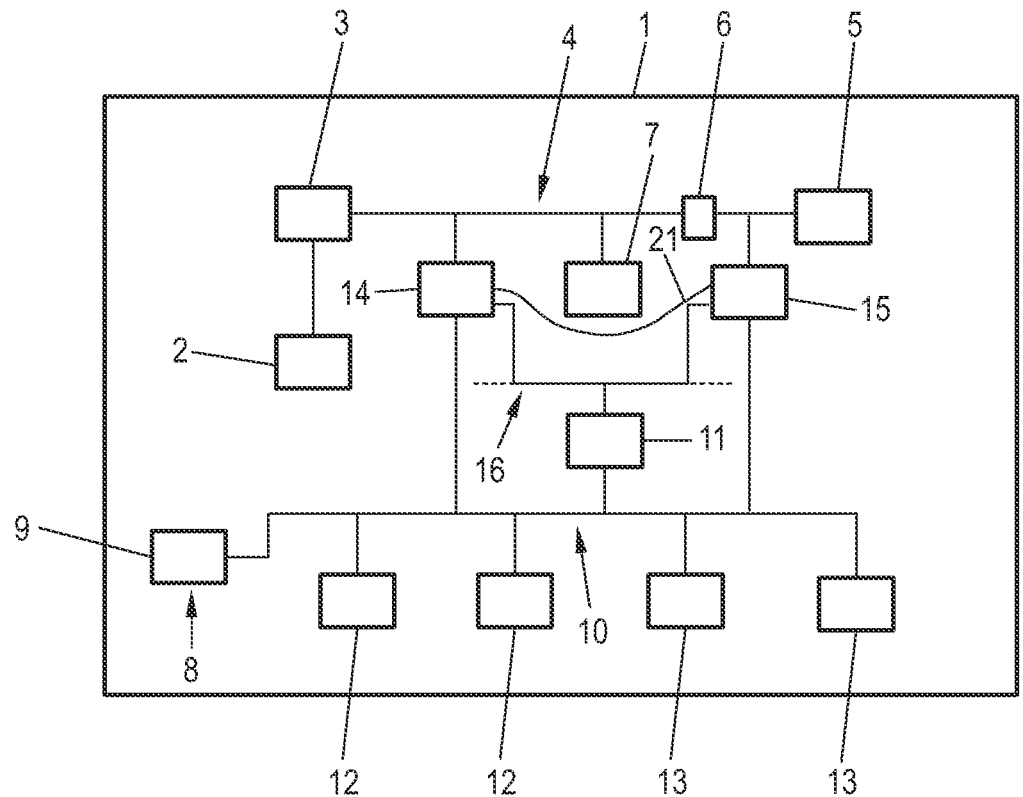
FIG. 1 shows a schematic sketch of a motor vehicle according to the disclosure.

FIG. 1 shows a schematic sketch of a motor vehicle 1 according to the disclosure. The motor vehicle 1 is designed as an electric vehicle and comprises an electric machine 2 for powering the motor vehicle 1, which is connected by an inverter 3 to a high-voltage network 4, the operating voltage of which can lie for example in the range of 350 V to 860 V. The high-voltage network 4 is powered from a high-voltage battery 5, which is connected to it across battery contactors 6. The high-voltage battery 5 can be charged by way of the electric machine 2, but also by way of a charging device at the motor vehicle side, not otherwise shown here, which can be part of additional high-voltage consumers 7. Other conceivable high-voltage consumers 7 not shown more closely here include air conditioner compressors, an electric heating system, and the like.

The motor vehicle 1 is also configured as an autonomous vehicle and therefore it comprises a vehicle system 8 designed for fully automatic driving of the motor vehicle 1, including a corresponding controller 9 for implementing a corresponding vehicle control function. The controller 9 is connected to a low-voltage network 10, which in the present case is operated at an operating voltage of 12 V. Further consumers are connected to the low-voltage network 10, only one energy management controller 11 being shown explicitly, while other low-voltage consumers 12, 13 can be divided into safety-critical or safety-relevant consumers 12 and non or less safety-critical or safety-relevant consumers 13, serving for example for comfort functions. Safety-critical or safety-relevant consumers 12, especially those necessary to the operation of the motor vehicle 1, include for example the brake system and the steering system of the motor vehicle 1, while the consumers 13 can include for example a multimedia system, a seat cushion heating, and the like.

In the present case, no battery is shown for the low-voltage network 10, although one can but need not be present, since the low-voltage network 10 is connected across two DC voltage converters 14, 15 to the high-voltage network 4 and these can also provide power to handle load demands in the low-voltage network 10. Each of the DC voltage converters 14, 15 can provide half of a maximum conceivable peak power in the low-voltage network 10, since it has been shown that this half is also sufficient to satisfy a maximum conceivable load demand of the safety-critical or safety-relevant consumers 12 (also including the controllers 8, 11).

The DC voltage converter 15 fulfills higher safety requirements than the DC voltage converter 14, for example safety requirements associated with a particular ASIL class. The DC voltage converter 14 provided for reasons of redundancy and thus increased functional safety can be a DC voltage converter 14 fulfilling safety requirements dictated for the conventional quality management, such as a QM converter. The DC voltage converter 15 is even connected behind the battery contactors 6 to the high-voltage network 4, and thus it can also still provide power when the high-voltage battery 5 is disconnected from the high-voltage network 4.

The DC voltage converters 14, 15 are situated at different positions in the motor vehicle 1, as is also indicated schematically in FIG. 1. For example, one of the DC voltage converters 14, 15 can be installed in the front area, for example in an engine compartment, of the motor vehicle 1, while the other DC voltage converter 15, 14 can be installed in the rear area of the motor vehicle 1, for example in the subfloor beneath a trunk space.

Figure 2:
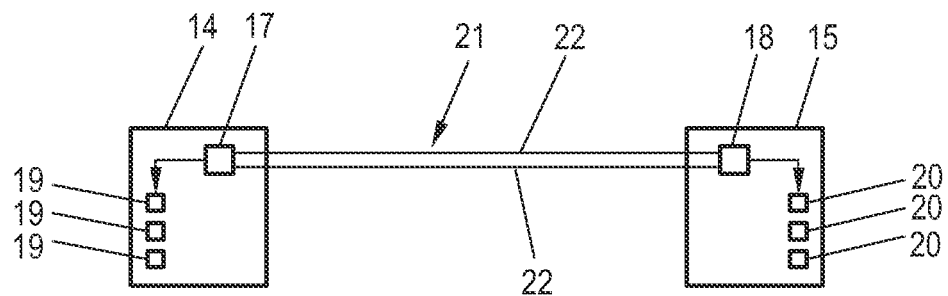
FIG. 2 shows a communication structure in the context of a feedforward of two parallel DC voltage converters.

The DC voltage converters 14, 15 are connected by way of a bus system 16, to which other communication participants are also connected, for example by way of a FlexRay bus and/or a CAN bus, to the energy management controller 11, which dictates the general control strategy for regulating to the operating voltage of the low-voltage network 10 for the DC voltage converters 14, on a slower time scale. However, in order to also possible to respond to suddenly occurring or disappearing highly dynamic changes in the load demand in the low-voltage network 10, there is provided a feedforward on a second, fast time scale in each of the DC voltage converters 14, 15 by way of a corresponding hardware regulator 17, 18, shown in FIG. 2. The hardware regulators 17, 18 activate with corresponding control signals, as shown, the components 19, 20 of the respective DC voltage converters 14, 15, for example power semiconductor switches. The activation can be done, for example, by a pulse-width modulated control signal or an analog control signal.

In order to avoid oscillations, especially build-up events, due to the independent fast regulating by way of the hardware regulators 17, 18 and make possible an operation attuned to each other, the hardware regulators 17, 18 are connected across a fast, discrete and highly available communication connection 21, also shown in FIG. 1, which is provided in addition to the bus system 16 and makes possible faster transmission times. As can be seen from FIG. 2, the communication connection 21 as a bidirectional communication connection directly and immediately connects the hardware regulator 17 and 18, in the present case by way of two communication lines 22, each of which can be assigned for example to one communication direction. In the present configuration described here, the control signals of the hardware regulators 17, 18 are used not only to activate the components 19, 20, but also provided as regulating information via the communication connection 21 to the other respective hardware regulator 17, 18 as additional input, for example as analog signals or as pulse-width modulated signals. This means that, as compared to the prior art, the hardware regulators 17, 18 have an additional output and an additional input, and the regulating information of the communication connection received via the additional input is further taken into account during the regulating operation of the respective receiving hardware regulator 17, 18. Thus, depending on the desired regulating properties, the hardware regulators 17, 18 will be designed such that the additional input, namely, the regulating information of the other hardware regulator, is immediately processed and thus taken into account. In this way, an improved attunement can be accomplished, even on extremely short time scales, here in the context of the feedforward. For example, the transmission time via the communication lines 22 can be shorter than 100 μs.

It should be further mentioned in this place that the communication connection 21 can also be utilized further, for example, in order to deactivate one of the DC voltage converters 14, 15 in the fastest way possible in event of a fault, for example, or an implausible operation. While it is basically conceivable to also connect a safety device to the communication connection 21 for this, it can also be provided to check the plausibility receiving regulating information within the hardware regulators 17, 18, generally designed preferably as microchips, and to send back a special deactivation signal across the communication connection 21 to the other hardware regulator 17, 18, resulting in the deactivation.

While the configuration represented here, utilizing control signals as the regulating information, constitutes an especially advantageous configuration in terms of transmission speed and direct processing ability, other possibilities are also basically conceivable, such as the use of a master-slave architecture with an especially proprietary communication protocol via the communication connection 21.

German patent application no. 1020221131199.8, filed May 25, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
a first voltage network;
a second voltage network,
wherein an operating voltage of the second voltage network is lower than an operating voltage of the first voltage network, and
two Direct Current (DC) voltage converters connecting the second voltage network to the first voltage network,
wherein each of the DC voltage converters includes a hardware regulator that regulates the operating voltage of the second voltage network, wherein the DC voltage converters are physically separated in the motor vehicle, wherein the hardware regulator of a first one of the DC voltage converters is connected to the hardware regulator of a second one of the DC voltage converters via a communication connection having at least one communication line, wherein the hardware regulator of the first one of the DC voltage converters, in operation, sends first regulating information via the communication connection to the hardware regulator of the second one of the DC voltage converters, and wherein the hardware regulator of the second one of the DC voltage converters, in operation, performs a first regulating operation based on the first regulating information sent by the hardware regulator of the first one of the DC voltage converters.

2. The motor vehicle (1) according to claim 1, wherein the communication connection is bidirectional.

3. The motor vehicle according to claim 2, wherein the communication connection includes at least two communication lines.

4. The motor vehicle according to claim 2, wherein the hardware regulator of the second one of the DC voltage converters, in operation, sends second regulating information to the hardware regulator of the first one of the DC voltage converters, and wherein the hardware regulator of the first one of the DC voltage converters, in operation, performs a second regulating operation based on the second regulating information sent by the hardware regulator of the second one of the DC voltage converters.

5. The motor vehicle according to claim 1, wherein at least the hardware regulator of the first one of the DC voltage converters, in operation, performs analog or pulse-width modulated transmission of the first regulating information or transmits a regulating signal that activates components of the respective DC voltage converters as the first regulating information to the hardware regulator of the second one of the DC voltage converters.

6. The motor vehicle according to claim 5, wherein the hardware regulator of the first one of the DC voltage converters, in operation, transmits the regulating signal, wherein the regulating signal activates semiconductor switches of the respective DC voltage converters.

7. The motor vehicle according to claim 6, wherein the hardware regulator of the first one of the DC voltage converters, in operation, transmits the regulating signal using a proprietary transmission protocol.

8. The motor vehicle according to claim 1, wherein the hardware regulator of the first one of the DC voltage converters and the hardware regulator of the second one of the DC voltage converters form a master-slave architecture, wherein the hardware regulator of the DC voltage converters fulfills a higher safety requirement than the hardware regulator of the second one of the DC voltage converters, and the hardware regulator of the DC voltage converters operates as a master of the master-slave architecture.

9. The motor vehicle according to claim 1, wherein upon recognizing a malfunction of the DC voltage converters by the hardware regulator of the second one of the DC voltage converters or a safety device connected to the communication connection, the hardware regulator of the second one of the DC voltage converters or the safety device, in operation, sends a deactivation signal to the first one of the DC voltage converters via the communication connection.

10. The motor vehicle according to claim 1, wherein each of the hardware regulator of the first one of the DC voltage converters and the hardware regulator of the second one of the DC voltage converters is a microchip.

11. The motor vehicle according to claim 1, wherein the hardware regulator of the DC voltage converters and the hardware regulator of the second one of the DC voltage converters, in operation, carry out a feedforward within a control system hierarchy, wherein the DC voltage converters are connected by a bus system to an energy management controller which, in operation, organizes a regulating strategy on an overarching time scale based on data obtained via the bus system from the DC voltage converters.

12. The motor vehicle according to claim 1, wherein the first one of the DC voltage converters fulfills a higher safety requirement than the second one of the DC voltage converters and is connected to battery contactors of a battery powering the first voltage network.

13. The motor vehicle according to claim 1, wherein each of the DC voltage converters, in operation, provides power that operates safety-critical consumers in the second voltage network or half of a maximum peak power required in the second voltage network.

14. The motor vehicle according to claim 13, wherein the DC voltage converters, in operation, provide the maximum peak power together.

15. A method of operating a motor vehicle including a first voltage network, a second voltage network, an operating voltage of the second voltage network being lower than an operating voltage of the first voltage network, and two Direct Current (DC) voltage converters connecting the second voltage network to the first voltage network, each of the DC voltage converters including a regulator that regulates the operating voltage of the second voltage network, the DC voltage converters being physically separated in the motor vehicle, each of the DC voltage converters including a hardware regulator, and the hardware regulator of a first one of the DC voltage converters being connected to the hardware regulator of a second one of the DC voltage converters via a communication connection having at least one communication line, the method comprising:

sending, by the hardware regulator of the first one of the DC voltage converters, regulating information via the communication connection to the hardware regulator of the second one of the DC voltage converters; and performing, by the hardware regulator of the second one of the DC voltage converters, a regulating operation based on the regulating information sent by the hardware regulator of the first one of the DC voltage converters.

* * * * *

UNITED STATES PATENT AND TRADEMARK OFFICE
CERTIFICATE OF CORRECTION

PATENT NO. : 12,377,730 B2
APPLICATION NO. : 18/322447
DATED : August 5, 2025
INVENTOR(S) : Roman Straber It is certified that error appears in the above-identified patent and that said Letters Patent is hereby corrected as shown below:

In the Claims

Column 9, Claim 2, Line 18:
"vehicle (1) according" should read: --vehicle according--.

Column 9, Claim 8, Line 53:
"regulator of the DC" should read: --regulator of the first one of the DC--.

Column 9, Claim 8, Line 56:
"hardware regulator of the DC voltage" should read: --hardware regulator of the first one of the DC voltage--.

Column 9, Claim 9, Line 59:
"a malfunction of the DV voltage" should read: --a malfunction of the first one of the DC voltage--.

Column 10, Claim 11, Line 12:
"hardware regulator of the DC voltage" should read: --hardware regulator of the first one of the DC voltage--.

Signed and Sealed this
Fourteenth Day of October, 2025

John A. Squires
*Director of the United States Patent and Trademark Office*